June 14, 1927.
E. BELIN
1,632,163
OPTICAL RECEIVER FOR TELETYPE MACHINES
Filed Nov. 1, 1923
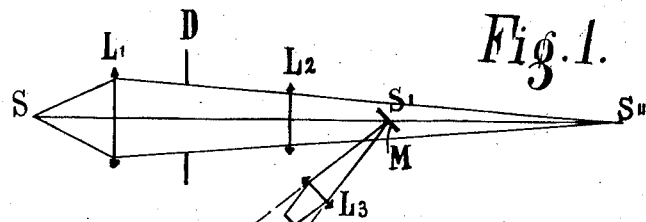
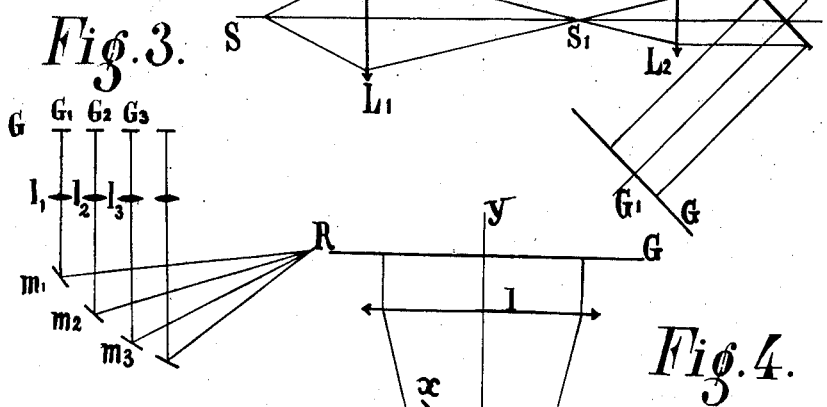
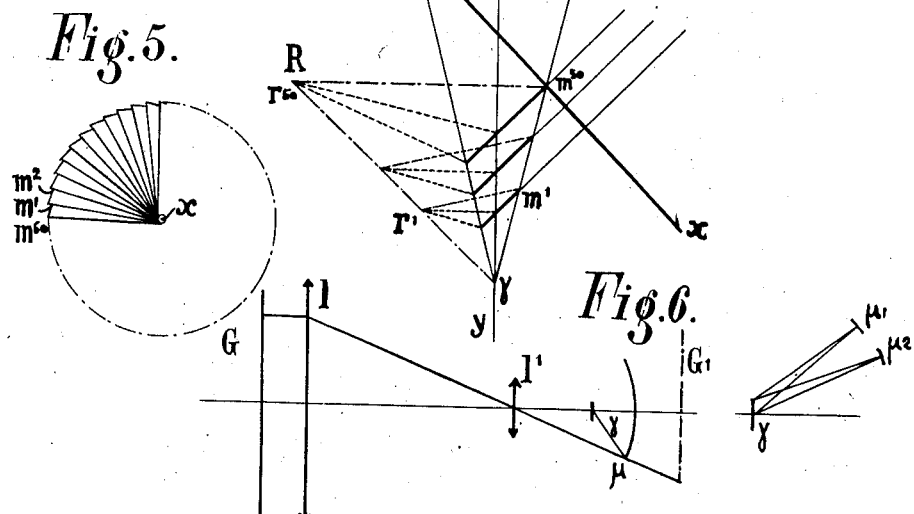
Inventor
E. Belin.
By Robb, Robb & Hill
Attorneys.

Patented June 14, 1927.

1,632,163

UNITED STATES PATENT OFFICE.

EDOUARD BELIN, OF RUEIL, FRANCE.

OPTICAL RECEIVER FOR TELETYPE MACHINES.

Application filed November 1, 1923, Serial No. 672,206, and in France November 4, 1922.

This invention relates to improvements in and combinations of optical elements which allow currents of varying direction and strength to be used for photographic reception with a transmitter of the teletype or tachytelegraphic type described in my U. S. Patent No. 1,175,685 dated March 14, 1916.

This patent describes the use of apparatus employing a perforated strip provided with conventional writing and printing signs whereby currents of positive and negative polarity and of a strength varied by the insertion of added resistances pass into the line which connects it with the receiving station.

In practice it is difficult to obtain by the addition of resistances in the line, variations at the end of the line which are comparable one with another; indeed the line does not remain comparable with itself.

On the other hand additional resistances suitable for obtaining the desired result as a function of a predetermined line constant will only remain exact for a single value of such constant.

It is moreover to be noted that even if such conditions were always fulfilled, then when the number of added resistances is at the maximum they will attain considerable values due to the fact that the transmitter sends the current of variable voltage which may commence for example at ±40 and increase by 2 up to ±130 and over.

The line leads to an aperiodic oscillograph or galvanometer whose mirror changes position according to the voltage and the direction of the received current.

Figure 1 of the accompanying drawings shows diagrammatically a novel and simple optical arrangement which may be connected with such galvanometer.

Referring to Figure 1 S is a luminous point located in the focus of a lens $L_1$; the emergent beam converges to S″ and falls on a plate D having in it a rectangular aperture in the form of a diaphragm whose size of aperture is capable of adjustment. The spot of light is received by a lens $L_2$ which produces in the receiving galvanometer mirror M the image S′ of the source S of light. The reflected beam will at a distance corresponding to the focal length of $L_2$ reflect a space image D′ of the aperture of diaphragm D. $L_3$ is a cylindrical lens in the path of the reflected beam whereby at D″ a condensed and very luminous image of said aperture is obtained. This image coincides with the plane of a scale G on which are conventional letters and signs and the like identical with those of the transmission scale.

It will be seen that according to the position of mirror M (i. e. according to the strength and polarity of the received current and again according to the sign which is simultaneously present in the transmitter) the light coming from source S will, as lens $L_3$ is cylindrical and has its axis in the lane of the two beams, fall upon the corresponding sign of the receiving scale G; the correspondence of the sign being effected by regulation.

The interposition of the diaphragm and the substantial diminution of light resulting therefrom may be avoided by employing the optical arrangement illustrated in Figure 2.

Referring to this figure, the image S′ of the source of light S produced by lens $L_1$ is caught by an objective $L_2$ of very short focal length; S′ being in the focus of $L_2$.

The emergent very fine parallel beam falls on mirror M which is of the same order of magnitude; the reflected beam therefore contains all light emitted by source S and falls on the latter scale G to be illuminated.

In both cases therefore signs placed in line on scale G are illuminated, the beam falling successively on the signs corresponding to the signs passing through the transmitter.

This effect is utilized to produce a line as in a telegraphic tape or a column or any other predetermined formation.

It is obvious that all the images can be reproduced at the same fixed point in front of which moves a sensitized receiving strip.

In Figure 3 there is illustrated for example a series of illuminated signs $G_1$, $G_2$, $G_3$ whose reflected light or diffused light is utilized according as the signs on screen G are opaque or translucent provided the rays are parallel. To prevent any overlapping of the beams, mirrors $m_1$, $m_2$, $m_3$ of a size small enough to allow them to be plane (tangents to the curve) are arranged in a parabola of which R is the focus.

It is obvious that when objectives $l_1$, $l_2$, $l_3$, which give at R images of the signs $G_1$, $G_2$, $G_3$ . . . are interposed the surface R will receive at one point all the images of the successively illuminated signs and so, provided its displacements synchronizes with the speed of the sequence of illuminations, a complete record will be obtained.

As however the transmitter sends, or can send 500 signs per second, this solution can only be theoretical. This would for example correspond to ten lines of one page of a newspaper.

The moving surface at R would therefore have to assume 500 positions with ten rectilinear displacements, ten returns and nine lines spaces per second.

It would moreover only be possible to impart to a recording surface at most a movement corresponding to the space lines, leaving to independent means the duty of alining the images rectilinearly to form the line.

An arrangement for effecting this is formed of a very simple apparatus which may be compared to the movements of a moving spiral staircase. Supposing a line is formed of 50 signs, then 50 mirrors formed of arcs of $$\frac{360°}{50} = 7° \ 12''$$

are arranged along and about the same axis while the distance between the planes of the mirrors produce by reflection a proper spacing of the two signs received on the surface of the record. Such a reflecting device is shown diagrammatically in Figure 5 and it consists of a series of plane mirrors $m^1$ to $m^{50}$ which are spirally arranged about the axis of the reflector and extending perpendicularly thereto after the manner of the arrangement of a spiral staircase about a center post.

By placing the reflecting system in front of the illuminated scale and at 45° to the beam which emanates from it, it will at once be seen that any sign illuminated will be reflected on the receiving surface at a point which corresponds to the position of the mirror axis of the mirror then receiving the beam.

Figure 4 shows an arrangement of this type. Supposing the operation takes place at the beginning of a line, the mirror $m'$ which is furthest away is brought to the axis $y$—$y$ of the luminous beam emanating from G; the illuminated sign $g$ will be transmitted to the nearest portion $r'$ of the receiving surface. If the mirror system moves about its axis $x$—$x$ situated at an angle of 45° to the axis $y$—$y$ of the luminous ray and in synchronism with the illumination then during the second sign the next mirror $m''$ nearer by one step will receive the beam; the reflected sign $r''$ will be by the side of the first but will be separated therefrom by a space and so on. During the 50th sign, the mirror $m^{50}$ closest to the scale will be illuminated, the sign will be reflected at $r^{50}$ at the end of the receiving line R, i. e. at the end of the line which will thus be unbroken.

In practice there is interposed in front of scale G whose signs are illuminated in any order by the movements of the mirror M, a lens $l$ which causes the luminous rays emanating therefrom to converge to a point $\gamma$. A shaft provided with 50 plane reflecting surfaces $m'$ $m''$ ... $m^{50}$ rotates at $x$—$x$ at an angle of 45° to the axis $y$—$y$ of the beam; each mirror $m'$ ... $m^{50}$ is formed of an equal arc as will be seen from Figure 5. The shaft $x$—$x$ turns in synchronism with the transmitter so that 50 transmitted signs correspond to one revolution of the shaft; by this means the 50 transmitted signs will be alined on a line R of the receiving surfaces. As the receiving surface is sensitized a photographic record of the letters illuminated on G is obtained, i. e. the signs transmitted are photographically recorded. It will be understood that the shaft $x$—$x$ may rotate continuously, the time of exposure of each sign being equal to the 50th part of the time taken for one revolution.

This arrangement allows the number of mirrors $m$ on which the beam $y$—$y$ falls to be varied. If it be desired to reproduce at R a line whose signs are double size (change of fount), there would only be 25 signs to a line; the beam $y$—$y$ should fall on 25 mirrors only. The receiving surface will then only require to be moved to produce the space between lines.

On developing (which may take place immediately after exposure) a print is obtained having on it all the lines of print transmitted, thus forming a true record; this may be of great importance for newspapers published at different places as it will eliminate for example the linotyping required for the various editions which are at present really made up merely by copying telegrams or ordinary messages. The importance of this is increased from the fact that the optical system allows the scale G to be adapted for several founts; this is explained in my patent hereinbefore mentioned.

The optical system above described and diagrammatically illustrated in Figure 4 is theoretically correct; it amply suffices for a scale G of small range for example one in which the signs are phonetic or conventional.

When however scale G has a wide range it is impossible to obtain at $\gamma$ a clear image of all the signs unless the lens $l$ is of undue size and the arrangement such that the central zone of lens is alone acted on by the emergent rays for the purpose of avoiding all aberration.

To obviate such arrangement which in practice would be impossible, a system of mirrors diagrammatically illustrated in Figure 6 may be employed.

Two lenses $l$ $l_1$, are arranged in front of the scale G, such lenses giving at $G_1$ a clear image of $g$; $\mu$ is an interposed reflecting surface bringing the beam to a single point $\gamma$.

The spiral system of mirrors above described is then placed in the path of the beam reflected between $\mu$ and $\gamma$. The surface cannot be formed of a single surface as the symmetrical and centered system will give at $\gamma$ not a point, but an image of the whole of the scale G. In place of $\mu$ therefore a system of plane mirrors $\mu_1, \mu_2, \mu_3$ (of a number equal to that of the signs on G) is provided whereby the centres of all the spots of light are made to converge and give at the same single central point $\gamma$ a clear image of each letter or a clear image of G.

The rotating mirror system is interposed between the mirrors $\mu_1, \mu_2$ and $\gamma$ so obtaining clearness of the reflected signs because the mirrors $m' \ldots m^{50}$ forming it move each in its own plane.

It easily can be seen that the positioning axes of mirrors $\mu_1, \mu_2 \ldots$ should, in accordance with the optical characteristics of the system $l-l_1$ and the distances $G_1$; $l\, l_1$; $l_1\, G_1$; $G_1\, \mu_1$; $\mu\, \gamma$; be arranged in a curve.

I claim:

1. In apparatus of the class described, a source of light, an associated member comprising a series of signs or intelligences, means responsive to current impulses sent from a transmitting station to selectively illuminate any of said signs, a sensitized receiving surface, and a rotatable optical device composed of a system of reflecting surfaces arranged in successive positions extending perpendicularly to the axis of rotation, each bearing a definite relation to successive fixed points on the receiving surface whereby the images assume a lined relationship.

2. In apparatus of the class described, a source of light, an associated member comprising a series of signs or intelligences, means responsive to current impulses sent from a transmitting station to selectively illuminate any of said signs, a receiving surface, and an optical device composed of a system of reflecting surfaces arranged in successive parallel planes adapted to be moved to intersect the paths of the projected images and throw the same upon the receiving surface in successive positions.

3. In apparatus of the class described, a source of light, an associated member comprising a series of signs or intelligences, means responsive to current impulses sent from a transmitting station to selectively illuminate any of said signs, means to receive the images of said signs and project them to a fixed point, a receiving surface, and an optical device composed of a system of reflecting surfaces fixed about a common axis in the form of a spiral staircase and adapted to receive the images of the respective signs from the aforesaid projecting means, said surfaces being related one to the other such that the successive images are thrown upon the receiving surface aforesaid into juxtaposed relation.

4. In apparatus of the class described, a source of light, an associated member comprising a series of signs or intelligences, a reflecting device responsive to current impulses sent from a transmitting station to selectively illuminate any of said signs, an optical system for receiving said signs and projecting them to a fixed point, a movable reflecting device disposed at said fixed point and composed of a system of reflecting surfaces arranged in successive parallel planes, and a receiving surface disposed to receive the images projected from said movable reflecting device on which the images are thrown into juxtaposed lined relation.

5. In apparatus of the class described, a source of light, an associated member comprising a series of signs or intelligences, a mirror oscillograph responsive to current impulses sent from a transmitting station to selectively illuminate any of said signs, means for condensing and reflecting the images of said signs thus illuminated to a fixed point including an arcuately arranged series of reflecting mirrors, a rotary reflecting device arranged at said fixed point and composed of a spirally arranged system of mirrors, and a receiving surface angularly related to the rotary reflecting device on which the images are imposed in side by side lined relationship.

6. An optical device for tachy-telegraph and teletype systems of the class described composed of a plurality of successive reflecting surfaces arranged on a common axis and in different parallel planes.

7. An optical device for tachy-telegraph and teletype systems of the class described composed of a plurality of reflecting surfaces arranged at right angles to the axis and in different planes.

8. An optical device for tachy-telegraph and teletype systems of the class described composed of a plurality of spirally arranged reflecting surfaces disposed in planes parallel to each other.

9. A rotatable optical device for tachy-telegraph and teletype systems of the class described composed of a series of reflecting surfaces arranged perpendicularly to the axis of rotation and in the form of a spiral staircase.

EDOUARD BELIN.